INVENTOR.
RUSSELL G. SMITH
BY
J. Warren Kinney Jr.
ATTORNEY

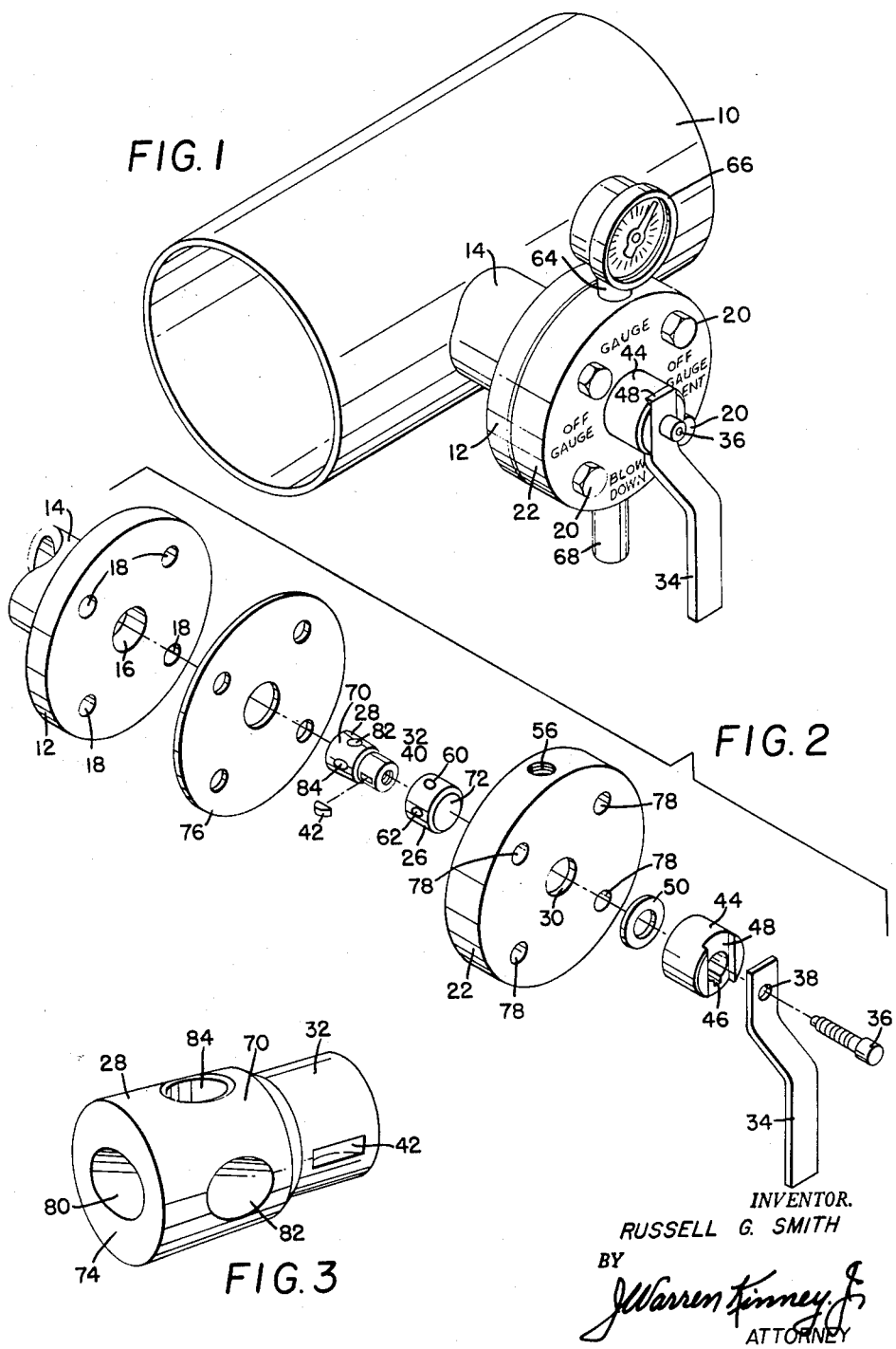

United States Patent Office 3,198,015
Patented Aug. 3, 1965

3,198,015
VALVE GAUGE MOUNTING
Russell G. Smith, Cincinnati, Ohio, assignor to Continental Manufacturing Company, Cincinnati, Ohio, a corporation of Ohio
Filed Aug. 23, 1962, Ser. No. 218,940
9 Claims. (Cl. 73—420)

The present invention relates to a valve gauge mounting adapted for application to a fluid pressure system to be periodically gauged and sampled, and blown down if necessary. Heretofore it was customary to install a gauge upon a pressure system, with the use of a variety of standard pipe fittings such as valves, T's, nipples and the like, which eventuated in a bulky and unsightly complex of parts expensive to acquire, assemble and maintain.

One of the objects of the present invention is to provide improved means for the installation of a gauge in connection with a fluid pressure system, whereby the installation is greatly simplified and expedited, with substantial savings of time, labor, and expensive parts.

Another object is to simplify and expedite the taking of fluid samples and pressure readings, using a single actuator easily manipulated for the purposes stated and for blowing down the system and venting the gauge, all in accordance with the will and choice of the attendant.

A further object of the invention is to provide improved means for the purposes stated, characterized by its compactness, low cost, and freedom from servicing requirements.

The foregoing and other objects are attained by the means described herein, and illustrated upon the accompanying drawings, in which:

FIG. 1 is a perspective view of the gauge assembly applied to an element of a typical fluid pressure system.

FIG. 2 is an exploded perspective view of the device of the invention, showing the constituent parts thereof in assembly order.

FIG. 3 is an enlarged perspective view of a valve plug which constitutes one of the parts.

Figure 4:
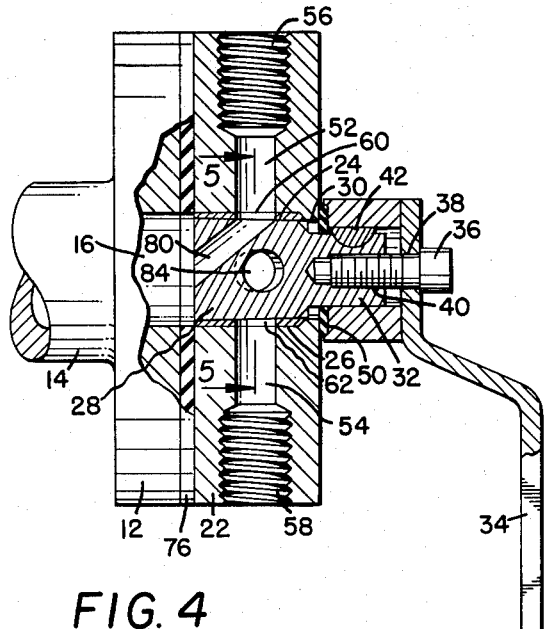
FIG. 4 is a side elevation of the device of the invention, partly in cross-section.

With reference to FIG. 1, the character 10 indicates a tank, pipe, manifold or other container of fluid under high pressure, usually a liquid. In the course of installation, the fluid container may be equipped with a weld neck flange 12, or mounting flange, communicating with the fluid container by way of a short pipe section 14 suitably welded, soldered, or otherwise fixed thereto. Flange 12, a standard weld neck flange, as indicated upon FIGS. 2 and 4, may be in the general form of a heavy disc of metal having a central opening 16 in communication with pipe section 14, the opening being ringed by a series of bolt holes 18 formed or drilled in the flange transversely of its plane. The holes may be tapped, if desired, to receive bolts 20 which mount the gauge support 22 upon the disc.

Gauge support 22 may be in the form of a thick metallic disc as shown, bored centrally thereof as at 24 to receive a liner or sleeve 26 of sealing material, within which may be rotatably supported the valve plug 28 formed preferably of a metal selected to withstand any injurious effects of the fluid to be gauged. It may be noted that the bore 24 at its outer end is provided with an annular shoulder 30 of reduced diameter, against which the outer end of sleeve 26 abuts to form a seal precluding fluid leakage along the stem 32 of the valve plug.

The plug may be rotated by means of a handle or actuator 34 fixed upon the free outer end of the plug stem, as by means of a screw 36 passing through an opening 38 of the handle and threaded into a tapped bore 40 of the stem. To assure fixation of the handle against rotation relative to the valve plug, it may be keyed thereto in any suitable manner. As herein disclosed, the plug stem accommodates a key 42 splined within a collar 44 having a keyway 46 formed therein, the collar being transversely channeled on one end as at 48 to accommodate the width of the apertured end of handle 34, FIG. 2.

The character 50 indicates a washer of suitable material for sealing the space between support member 22 and the collar 44, surrounding the valve plug stem.

The gauge support member 22 is provided with a pair of aligned ports 52 and 54 formed substantially diametrally of said member within the thickness thereof, said ports each terminating at the periphery of the member, where they may be internally screw-threaded as at 56 and 58. The inner ends of the ports terminate in the bore 24 of the valve chamber, where the stationary sleeve 26 is punctured as at 60 and 62 to permit flow of fluid from the valve plug to the outer ends of ports 52 and 54.

Port 52 at its threads 56 accommodates the threaded tubular neck 64 of a pressure gauge 66 for indicating pressure of fluid which may be directed into port 52 by manipulation of the valve plug. The threads of the lower port 54 may accommodate the threaded end of a discharge tube 68 adapted to vent the gauge and to discharge blow-down or sample fluid at times, from the tank or container 10.

With reference now to the valve plug 28, the seating surface 70 is seen to be slightly tapered to a smaller diameter in the direction of stem 32, so that the plug may seat and seal nicely within the correspondingly tapered seat bore 72 of liner or sleeve 26. The butt or inner end 74 of the valve plug is smooth, and normal to the axis of the plug, so as to firmly abut a gasket 76 clamped between the parts 12 and 22 by the screws 20 passing through openings 78 of member 22.

Figure 5:
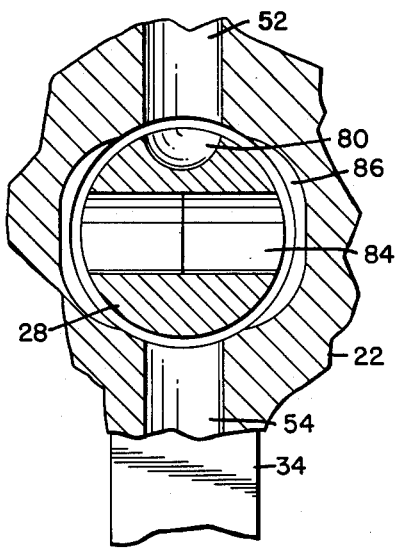
FIG. 5 is an enlarged cross-section taken on line 5—5 of FIG. 4, showing the valve in gauging position.

From the butt 74 of the valve plug, a main bore 80 is directed obliquely so as to terminate at 82 in the side seating surface 70 of the plug. This bore 80, in FIG. 4, is shown in position to direct pressure of fluid from entry pipe 14, to the bore 52 which supports the pressure gauge 66, in order to obtain a pressure reading. This same condition is indicated upon FIG. 5.

Figure 7:
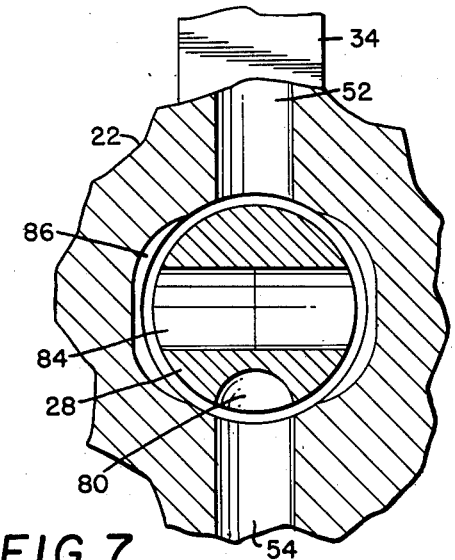
FIG. 7 is a view similar to FIG. 5, showing the valve in blown-down position.

By rotating the valve plug 28 a half turn, as represented by FIG. 7, the bore 80 is placed in position to direct fluid pressure from pipe 14 downwardly, thereby causing the fluid to escape through blow-down tube 68 by way of bore 54. As will be evident, a quarter turn of the plug from either of the positions above mentioned will result in disposition of the side opening 82 against a solid portion of sleeve 26, thereby closing off this end of bore 80 and preventing flow of fluid therethrough so that no fluid can escape from the tank or container 10.

Figure 6:
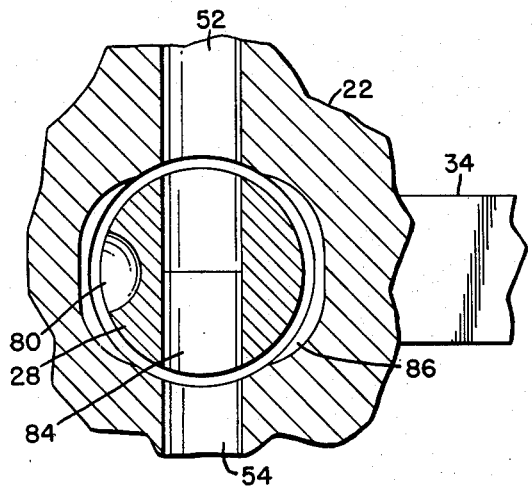
FIG. 6 is a view similar to FIG. 5, showing the valve in gauge venting or bleeding position.

The valve plug has a second bore or passageway 84 extending transversely therethrough, with opposite ends terminating in the seating face 70, substantially upon a diameter of the plug. This bore or passageway is a vent, which in a horizontal position of handle 34 provides communication between the bores 52 and 54 (FIG. 6), to vent or bleed the gauge 66 through the blow-down tube 68. When the vent 84 is in register with bores 52 and 54, the main bore 80 of the valve plug will be closed against a solid portion of sleeve 26, so that no liquid may escape from tank or container 10. On the other hand, when the main bore 80 is in register with either of the bores 52 or 54, as for example in FIG. 4, opposite ends of the vent 84 are closed against a solid portion of sleeve 26, rendering the vent ineffective for any purpose.

It may be noted that the drawings show vent 84 as a crooked passageway, rather than a straight bore. The purpose of this is merely to facilitate machining of the valve plug, and to avoid inadvertent break-through or weakening of the metal between bores 80 and 84.

At 86 are shown recesses or undercuts within the valve chamber, allowing the flexible material of sealer sleeve 26 to deform and key itself within the bore, so to avoid likelihood of the sleeve rotating with the valve plug when handle 34 is manipulated.

In the event of wear permitting fluid leakage about the valve plug, correction may be made by simply tightening the screw 36 to slightly shift the valve plug axially outwardly, this resulting in drawing the tapered plug more tightly into the sealer sleeve 26 to reduce clearance.

The improved device of the present invention possesses many features of merit not realized under old and conventional methods of pressure gauge installation. For example, there is eliminated the need for numerous pipe fittings and valves, and the expense of time and labor heretofore required for effecting the installation. The taking of gauge readings, bleeding of the gauge, and the performance of blow-down operations, are all accomplished by a simple manipulation of a single actuating lever or handle, and with a minimum expenditure of time and labor. The device, moreover, is very compact and trouble-free, and may be purchased and installed with less expense than heretofore was possible by conventional means. Other advantages have been mentioned hereinbefore, and still others will be manifest to persons conversant with the art to which the invention appertains.

It is to be understood that various modifications and changes may be made in the structural details of the device, within the scope of the appended claims, without departing from the spirit of the invention.

What is claimed is:

1. In a device of the class described, the combination of a weld neck flange for application to a container of high pressure fluid, and adapted to convey fluid from such container, a plate on and coextensive with said flange and bored transversely to provide a valve seat, with the bore coaxial with the weld neck flange to receive fluid therefrom, said plate secured to said flange and having radial passageways communicating with said bore, means for coupling a pressure gauge with one of said passageways, the other passageway being open to atmosphere, a valve element rotatable upon the valve seat of the transverse bore and having bores therein located for selective registry with the fluid container and the passageways of the plate, whereby upon rotation of the valve element to either of two different positions the container fluid may be directed selectively to the pressure gauge and to atmosphere through the passageways aforesaid, means for venting the gauge to atmosphere at another rotated position of the valve element, a single actuator for rotating the valve element, and means for detachably mounting the plate upon the weld neck flange.

2. The device as set forth in claim 1, wherein the combination includes a stationary flexible sleeve lining the said valve seat and surrounding the valve element, and means exposed at the valve actuator for selectively adjusting the seating force of the valve element upon said sleeve.

3. In a device of the class described, the combination of a ported plate-like mounting flange for application to a container of pressurized fluid and having means to convey fluid from said container to the port of the flange, said port being transverse to the plane of the flange, a gauge support in the form of a plate adapted to flatly abut the mounting flange in covering relationship to the said port, said gauge support being bored transversely with the bore thereof in axial alignment with the said port, and having formed therein opposed passageways arranged radially of the gauge support bore at opposite ends of a diameter thereof, means for mounting a fluid pressure gauge upon the gauge support in fluid communication with one of said passageways, a rotary valve plug fitted axially within the gauge support bore, and a handle fixed to an end of said plug for rotating the latter, the plug having an inner butt end bored substantially centrally thereof on an oblique angle with the plug bore and terminating in a side wall of the plug to place the plug bore in fluid communication selectively with either of the passageways of the gauge support incident to rotation of the plug by means of the handle, the oblique bore of the valve plug being in constant registry with the said port of the mounting flange, and a second bore in the valve plug having open ends exposed at the side walls of the plug, for establishing fluid communication between the opposed passageways of the gauge flange upon rotation of the plug to a position at which the oblique bore of the plug fails to register with said passageways.

4. The device as set forth in claim 3, wherein the combination includes means for securing the gauge support removably upon the mounting flange in flatwise contact to produce a composite structure.

5. A valve unit for application to a flange of a pipe communicating with a container of pressurized fluid, said valve unit comprising a plate of substantial thickness having an encircling peripheral surface and having flat outer and inner faces, means defining a plug bore in the plate extending transversely therethrough and opening through said outer and inner faces, a rotary plug mounted in said plug bore and having a reduced outer end stem portion projecting beyond said outer face of the plate, said plug having a main bore formed therein oblique to the longitudinal axis of the plug and having an inner ear opening through the inner end of the plug and having an outer end opening through the side of the plug, a second bore in the plug extending transversely of said axis and opening through opposite sides of the plug, a pair of oppositely extending bores in the plate having opposite outer ends opening through said peripheral surface of the plate and having inner ends opening into said plug bore, the ends of said second bore and said outer end of the main bore lying in a common plane with said inner ends of said pair of bores, one of said pair of bores forming a vent, means for coupling an instrument such as a gauge to the outer end of the other one of the pair of bores, a handle attached to said plug stem for turning the plug, and means for securing said plate to a pipe flange with said inner face of the plate opposing the face of the flange and with the plug bore aligned with the pipe.

6. A valve unit as defined by claim 5, wherein said plug bore is of slightly reduced diameter adjacent to the outer end thereof whereby is formed a flange which encircles the stem, the plug having a shoulder between the body part and the stem part thereof, said shoulder being at the inner side of said flange, a liner within the plug bore terminating at its outer end against said flange, the liner having a plug seating surface tapering toward said outer end and the plug being correspondingly tapered from its inner end to said shoulder, and means for drawing the plug into tight seating engagement with said liner.

7. A valve unit as defined by claim 5, wherein said plug bore is of slightly reduced diameter adjacent to the outer end thereof whereby is formed a flange which encircles the stem, the plug having a shoulder between the body part and the stem part thereof, said shoulder being at the inner side of said flange, a liner within the plug bore terminating at its outer end against said flange, the liner having a plug seating surface tapering towards said outer end and the plug being correspondingly tapered from its inner end to said shoulder, the attachment of the handle to the plug comprising a screw passing through the handle and engaging in a threaded bore in and opening through the outer end of the stem and means including said screw for drawing the plug into tight seating engagement with said liner comprising a spacer collar encircling the stem and extending beyond the outer end thereof, said collar being keyed to the stem and engaged at its outer end by the handle, the collar having its inner end opposed to the outer face of the plate and applying thrust against the plate when the screw is threaded inwardly to effect the said drawing of the plug to said seating engagement with the liner.

8. A device of the character described, comprising the combination of a weld neck flange designed for application to a container of high pressure fluid and embodying a centrally apertured disc and a pipe section on and projecting from one side face thereof and communicating with the aperture of the disc for conveying fluid from such container, a gauge support plate positioned against and co-extensive with the other side face of said flange disc and secured thereto, said support plate having a bore transversely therethrough and providing a valve plug chamber coaxial with and opening at one end into the aperture of said disc, said gauge support plate having passageways extending radially therein from and communicating with said bore and opening at outer ends thereof through the periphery of said plate, means for mounting a fluid pressure gauge upon said support plate in fluid communication with the outer end of one passageway, a rotary plug fitted for rotation in said valve plug chamber coaxially with said disc aperture, said rotary plug having only two separate passageways therethrough forming three ports opening through the side of the plug and a fourth port opening through the end of the plug toward said aperture of said disc, said three ports being positioned to be selectively registered with said gauge plate passageways by rotation of the plug, actuating means connected to the plug for rotating the same, and means detachably securing the gauge support plate to the flange disc.

9. A combined gauge support plate and valve unit for attachment to a weld neck flange carried by a container of high pressure fluid, said unit comprising a metal plate of substantial thickness having a perimeter and opposite plane faces, said plate having a bore extending transversely therethrough and opening through said opposite faces and providing a rotary valve plug chamber, said plate having fluid passageways extending radially therein from and communicating with said chamber and opening at outer ends thereof through the said perimeter of said plate, means for mounting a fluid pressure gauge upon said plate in fluid communication with the outer end of one passageway, a rotary plug fitted for rotation in said valve plug chamber and having an inner butt end terminating adjacent one side face of the plate and having a reduced stem extension at its other end projecting beyond the other side face of the plate, said rotary plug having two separate passageways therethrough forming three ports opening through the side of the plug and a fourth port opening through the said butt end of the plug, said three ports being positioned to be selectively registered with said radial passageways by rotation of the plug, means for maintaining said rotary plug seated in said plug chamber, and handle means attached to said stem extension for facilitating rotation of the plug.

References Cited by the Examiner

UNITED STATES PATENTS

| 1,032,649 | 7/12 | Bieniek | 251—310 X |
| 1,044,648 | 11/12 | Hamrick | 137—625 X |
| 1,309,018 | 7/19 | Conlon | 251—184 X |
| 1,491,115 | 4/24 | Taylor | 137—625 X |
| 1,689,231 | 10/28 | Dean | 73—389 X |
| 3,081,792 | 3/63 | Hansen | 251—307 X |

FOREIGN PATENTS 18,119   6/97   Great Britain.

RICHARD C. QUEISSER, *Primary Examiner.*

JOSEPH P. STRIZAK, *Examiner.*